US012428885B2

(12) United States Patent
Colpaert et al.

(10) Patent No.: US 12,428,885 B2
(45) Date of Patent: Sep. 30, 2025

(54) MAGNETIC LOCKING SYSTEM FOR A MOVABLE DOOR OR WINDOW

(71) Applicant: Renson Outdoor NV, Kruisem (BE)

(72) Inventors: Stijn Colpaert, Oudenaarde (BE); Ruben Vandendriessche, Oudenaarde (BE); Joost Benjamin Renaat De Frene, Waregem (BE)

(73) Assignee: Renson Outdoor NV, Kruisem (BE)

( * ) Notice: Subject to any disclaimer, the term of this patent is extended or adjusted under 35 U.S.C. 154(b) by 185 days.

(21) Appl. No.: 18/550,072

(22) PCT Filed: Mar. 17, 2022

(86) PCT No.: PCT/IB2022/052417
§ 371 (c)(1),
(2) Date: Sep. 11, 2023

(87) PCT Pub. No.: WO2022/195526
PCT Pub. Date: Sep. 22, 2022

(65) Prior Publication Data
US 2024/0218717 A1 Jul. 4, 2024

(30) Foreign Application Priority Data
Mar. 17, 2021 (BE) .................................. 2021/5203

(51) Int. Cl.
*E05C 19/16* (2006.01)
*E05C 1/06* (2006.01)
*E05D 15/06* (2006.01)

(52) U.S. Cl.
CPC ................ *E05C 19/16* (2013.01); *E05C 1/06* (2013.01); *E05D 15/063* (2013.01)

(58) Field of Classification Search
CPC ...... E05C 19/16; E05C 19/161; E05C 19/163; E05C 19/165; E05C 19/166; E05C 19/168; E05C 17/56; E05C 9/04; E05C 9/043; E05C 9/10; E05C 9/16; E05C 9/20; E05C 9/22; E05C 9/24; E05C 1/00; E05C 1/004; E05C 1/006; E05C 1/08; E05C 1/12; E05C 1/16; E05B 65/08; E05B 65/087; E05B 65/0876; E05B 53/003; E05B 53/005;
(Continued)

(56) References Cited

U.S. PATENT DOCUMENTS

2016/0305161 A1* 10/2016 McMahon .......... E05B 17/0041
2019/0178006 A1* 6/2019 Capozziello ........ E05B 63/0056
2020/0048934 A1 2/2020 Minter et al.

FOREIGN PATENT DOCUMENTS

CN 102797395 A * 11/2012
WO 2014094071 A1 6/2014

OTHER PUBLICATIONS

Notification of Transmittal of the International Search Report and Written Opinion for International Application No. PCT/IB2022/052417, mailed May 31, 2022.

* cited by examiner

*Primary Examiner* — Christine M Mills
*Assistant Examiner* — Yahya Sidky
(74) *Attorney, Agent, or Firm* — Hamilton, Brook, Smith & Reynolds, P.C.

(57) ABSTRACT

The present invention relates to means and methods for fixing a movable object, such as a door or window, to a frame. In particular, the present invention provides a magnetic locking system configured for releasably mounting a movable object to the frame.

20 Claims, 8 Drawing Sheets

(58) Field of Classification Search
CPC ............. Y10T 292/0841; Y10T 292/11; Y10T 292/1017; Y10T 292/0992; Y10S 292/46
USPC .................................................... 49/409–411
See application file for complete search history.

MAGNETIC LOCKING SYSTEM FOR A MOVABLE DOOR OR WINDOW

This application is the U.S. National Stage of International Application No. PCT/IB2022/052417, filed Mar. 17, 2022, which designates the U.S., published in English, and claims priority under 35 U.S.C. § 119 or 365 (c) to Belgium Application No. 2021/5203, filed Mar. 17, 2021. The entire teachings of the above applications are incorporated herein by reference.

TECHNICAL FIELD

The present invention relates to means and methods for fixing a movable object, such as a door or window, to a frame. In particular, the present invention provides a magnetic locking system configured for releasably fixing a movable object to the frame.

TECHNOLOGICAL BACKGROUND OF THE INVENTION

A sliding door or window supporting system consists of a stationary frame that is provided with a guide over which a sliding door or window can slide to and fro, for example by means of bearings or rollers. On one side of the frame, a locking mechanism may be mounted, to lock the sliding door or window. With modern sliding doors or windows, a hook lock is often chosen, by which the door can hook onto the frame. A typical hook lock consists of a movable component that is provided with a hook part that can engage on a locking mechanism that is mounted on an inner wall of the frame.

There are also other kinds of locking mechanisms, but regardless of the choice there is generally a lack of user-friendliness and flexibility. The user must first close the door completely before the locking mechanism can be put into operation. For modern devices it is advantageous to secure the door or window at various positions along the guide, for example when several sliding doors or windows are connected together.

Flexible locking may for example be achieved by providing several locking mechanisms in the frame, but then the user will be required to seek out repeatedly a correct door or window position at which the opening overlaps with the movable component of the locking mechanism. Carrying out such operations will be considered by a user as very undesirable. This will also increase the complexity of the system, which leads to a higher cost price.

From CN102797395A, a door locking system is known for a housing of communication equipment. The door locking system comprises four magnets, which are mounted in a groove facing the door, in a door frame, or simply frame, round the perimeter of the door. The door locking system comprises four corresponding extendable blocks, which are mounted at corresponding positions on the perimeter of the door. The door may be placed in the door frame by holding the extendable blocks in a retracted position by tightening respective cables that are connected to a handle. When the door is placed in the door frame so that the extendable blocks of the door are aligned with the door-facing groove of the door frame, the four extendable blocks can be moved together in the groove of the door frame by operating the handle so that the cables allow the blocks to slide out. Then the extendable block is attracted and held in the groove of the door frame by means of the magnets that are positioned opposite these extendable blocks. A drawback of such a system is that the door must first be aligned relative to the door frame so that the extendable blocks can go into the groove of the door frame. During this alignment, the handle has to remain activated in order to keep the blocks in the retracted position. It is only once the alignment of the blocks and the grooves has been brought about that the handle can be deactivated to allow the blocks to slide out into the groove of the door frame. Although all blocks can be operated with one handle, this still requires a complex and precise operation to allow all four blocks to align accurately with the groove of the door frame, while the operator must continue to keep the handle permanently and completely in the activated position until this alignment is achieved. Owing to the necessary alignment, reliable and robust closure is difficult to achieve, or precise alignment must be achieved between the blocks and the grooves, so that there is a risk that with insufficiently precise alignment the blocks may not go into the grooves, or a large enough tolerance must be provided, so that in the closed state there is a risk that the door can still move excessively to and fro, and for example under a high wind load will make undesirable movements, which may give rise to deformations and/or undesirable sounds such as rattling. It is also clear that the door of such a housing can only be introduced into the door frame in one position and can only be fixed in one position in the door frame by means of the door lock, namely the closed position wherein the door completely closes the door frame. It is also clear that such a door of a housing relates to a removable access door or cover and not a sliding door or hinged door. Finally, in the closed state, the movable block remains accessible via the space between the door perimeter and the door frame, which makes it difficult to prevent undesirable manipulation of the movable block, for example to prevent inadmissible access to unlock the door.

WO2014/094071A1 describes a locking mechanism for locking a door to a door frame in a closed position. The locking mechanism comprises an extendable magnetic bolt at the top and at the bottom of the door. In the closed position of the door, these magnetic bolts are aligned with ferromagnetic blocks in the door frame round the perimeter of the door. Through the force of magnetic attraction, as soon as this aligned position is reached, the extendable magnetic bolt is pushed out of the door to a locked position against the ferromagnetic blocks in the door frame. A handle that is connected with cables to the extendable magnetic bolts makes it possible to bring the bolts back to their retracted position. In other words, on activation of this handle, the coupling between the extendable magnetic bolts and the ferromagnetic blocks is broken again. In the door frame, at the level of the ferromagnetic blocks, a channel is provided in which the magnetic bolt can penetrate as far as the ferromagnetic blocks, to lock the door in the closed position. Here too there is the drawback that owing to the required alignment to bring about locking, reliable and robust closure becomes difficult to achieve, or precise alignment must be achieved between the extendable magnetic bolts and the channels for the ferromagnetic blocks, so that there is a risk that insufficiently precise alignment may not lead to locking, or a large enough tolerance must be provided, so that in the closed state there is a risk of excessive clearance in the locked state, with for example undesirable movements, deformations or undesirable sounds in consequence. Once again it is clear that the door can only be locked in one position on the door frame, namely the closed position, wherein the door is positioned in an outermost position against a stop of the door frame. Just as stated above, here too in the closed state the extendable magnetic bolt remains accessible via the space between the door perimeter and the door frame, so that a complex coupling system must be provided at the level of the connection of the cable to the extendable magnetic bolts to prevent, on closing the door, undesirable manipulation of the extendable magnetic bolt to unlock the door inadmissibly.

In US2020/0048934A1, a magnetically triggered locking mechanism is described, wherein a magnet in the door frame, when aligned with a magnet in a locking mechanism in the perimeter of the door, triggers a pretensioned extendable bolt to move from a retracted to an extended position, wherein the bolt engages in a corresponding opening in the door frame so as to lock the door. A handle can, by means of a cable, bring the extendable bolt back to the retracted, clamped position. This handle must, however, keep the extendable bolt in the clamped position until the door is far enough away from the magnetic trigger in the door frame. Here too there is the drawback that owing to the required alignment for bringing about locking, reliable and robust closure becomes difficult to achieve, or precise alignment must be achieved between the extendable bolts and the opening and the magnetic trigger in the door frame, so that there is a risk that insufficiently precise alignment does not lead to locking, or a large enough tolerance must be provided, so that in the closed state there is a risk of excessive clearance in the locked state with for example undesirable movements, deformations or undesirable sounds in consequence. Here too it is clear that the door can only be locked in one position on the door frame, namely the closed position, wherein the door is positioned in an outermost position against a stop of the door frame. Just as stated above, in the locked state the extendable bolt remains accessible via the space between the door perimeter and the door frame, so that a complex coupling system must be provided at the level of the connection of the cable to the extendable bolts to prevent, on closing the door, undesirable manipulation of the extendable bolt unlocking the door inadmissibly.

There is thus a need for the development of a new and improved locking mechanism to rectify the shortcomings of the prior art. In particular there is a need for a flexible locking mechanism with which the user can secure a sliding door or window in a frame in a simple and user-friendly way, without requiring complex operations and/or additional components. In addition, there is a need for a locking mechanism of this kind that makes more robust and reliable locking possible.

SUMMARY

In order to satisfy the needs and shortcomings of the prior art described above, the inventors have developed methods and means for a sliding door or window supporting system. In particular, the present invention relates to a magnetic locking system for fixing a movable object, such as a sliding door or window, which is placed in a sliding guide of a frame. The locking system may be configured for a single-sided configuration, wherein a top or bottom of the object is fixed to the sliding guide of the frame, or a double-sided configuration, wherein both the top and the bottom of the object are fixed.

One aspect of the invention relates to a magnetic locking system for releasably fixing a movable object, such as a movable door or window, to a frame, the locking system comprising: at least one stop element mounted to the frame; at least one blocker mounted to the movable object, configured to be moved between: a retracted state configured to allow the blocker to move unhindered past the stop element; and an extended state configured to secure the blocker on the stop element when the blocker is moved till at the stop element; a locking mechanism mounted to the movable object and connected to the blocker, configured for selectively: in a first state, bringing and/or keeping the blocker in the retracted state; and in a second state, disconnecting the blocker to move it to the extended state, and wherein the blocker comprises a magnet and the stop element comprises a magnetically attractable material, and/or vice versa; configured so that in the extended state, the blocker is fixed to the stop element by attraction of the magnet toward the magnetically attractable material.

According to one aspect of the invention, a magnetic locking system is provided for releasably fixing a movable object, such as a movable door or window, to a frame, the locking system comprising:

- at least one stop element mounted to the frame;
- at least one blocker mounted to the movable object and configured to be moved between:
- a retracted state configured to allow the blocker to move unhindered past the stop element; and,
- an extended state configured to secure the blocker on the stop element when the blocker is moved till at the stop element;
- a locking mechanism mounted to the movable object and connected to the blocker, configured for selectively:
- in a first state, disconnecting the blocker to move it to the extended state;
- in a second state, bringing and/or keeping the blocker in the retracted state; and wherein the blocker comprises a magnet and the stop element comprises a magnetically attractable material, and/or vice versa; configured so that in the extended state, the blocker is fixed to the stop element by attraction of the magnet toward the magnetically attractable material,

CHARACTERIZED IN THAT

- the locking system further comprises a movement mechanism that is configured to bring about a movement of the movable object relative to the frame; wherein the movement mechanism comprises a holder, which has a passage with a first opening for mounting the blocker and a second opening for mounting a tensioning cable connected to the blocker; and wherein the holder is mounted between the movement mechanism and the movable object.

In this way, robust and reliable locking can be achieved, since the movement mechanism provides improved alignment of the movable object with the stop element in the frame.

In addition, the holder of the movement mechanism shields the blocker, so that undesirable manipulation via the space between the frame and the movable object is prevented.

According to a preferred embodiment, a locking system is provided, wherein the locking mechanism further comprises:

- a tensioning cable, connected with one end to the blocker; and
- a locking component that is configured to connect the locking mechanism selectively between the first state and the second state by acting upon the tensioning cable.

A locking mechanism of this kind is simple to produce.

According to a preferred embodiment, a locking system is provided, wherein the movement mechanism moves within the frame. According to particular embodiments, particularly wherein the movable object comprises a sliding window or a sliding door, the frame comprises or consists of an elongated guide profile for the sliding door or the sliding window that extends in the direction of movement of the sliding door or the sliding window.

In this way, the movement mechanism can achieve good alignment of the blocker and the stop elements in a simple manner, and the movable part of the blocker is shielded by the holder and by the frame.

In a preferred embodiment, the at least one blocker is mounted to a top and/or bottom of the movable object and the at least one stop element is mounted to a corresponding top and/or bottom of the frame.

In a preferred embodiment, the at least one blocker is mounted to an upper and/or lower outer wall of the movable object and at least one stop element is mounted to a corresponding upper and/or lower inner wall of the frame.

In a preferred embodiment, the locking system comprises at least two blockers, wherein a first, upper blocker is mounted to a top of the movable object and a second, lower blocker is mounted to a bottom of the movable object; and, at least two stop elements are mounted correspondingly to a top and bottom of the frame; preferably at opposite positions.

In a preferred embodiment, the locking system comprises at least two blockers, wherein a first, upper blocker is mounted to an upper outer wall and a second, lower blocker is mounted to a lower outer wall of the movable object; and, at least two stop elements are mounted correspondingly to an upper and lower inner wall of the frame; preferably at opposite positions.

In a preferred embodiment, the stop element comprises a recess, which is configured for inserting and mechanically fixing the blocker in the extended state.

According to a particular embodiment, the stop element with the recess is preferably mounted in such a way that an edge with magnetically attractable material is located around the recess, in the direction of movement of the movable object, and is located at a smaller distance from the movable object than the recess from the stop element. According to a preferred embodiment, this edge is closer to the blocker than the recess. This offers the advantage that the distance that must be bridged over by the blocker up to the stop element is less than the distance from the recess.

According to a preferred embodiment, the stop element is configured so that on further movement of the blocker in the direction of the recess by means of a movement of the movable object along the frame, the blocker, already magnetically attracted against the stop element, on reaching the recess will go into the recess on the basis of the magnetic attraction to the stop element.

This offers the advantage of a quicker, more reliable and more robust connection, since the additional distance that must be bridged over by the blocker to this extended state is more limited than the distance between the completely retracted and the completely extended state.

According to a preferred embodiment, the connection between the blocker and the stop element is achieved by means of the movement of the movable object alone, in other words without requiring an additional action or manipulation.

According to a preferred embodiment, the distance to the recess of the blocker in the retracted state is so great that the blocker is not moved to the stop on the basis of magnetic attraction from the first, disconnected, state, when the stop is located opposite the recess. This offers the advantage that a simple locking mechanism can be used, wherein means need not necessarily be provided or a correct further operation of the locking mechanism is necessary to keep the blocker in the retracted position and then to be able to move the movable object away from the position in the frame determined by this stop.

In a preferred embodiment, the locking system comprises a plurality of stop elements, for example two stop elements, which are mounted at various positions along the length of the frame to allow the blocker to move past or up to; preferably at equal distances from each other. It is clear that according to such an embodiment the stop elements are mounted in such a way that the movable object can be locked at various positions along the length of the frame.

In a preferred embodiment the locking mechanism comprises: a tensioning cable, connected with one end to the blocker, which is configured to limit the movement of the blocker to the extended state; a tensioning mechanism that is configured to keep the tensioning cable under tension by clamping the blocker to the retracted state; and a locking component that is configured to connect the locking mechanism selectively between the first state and the second state by acting upon the tensioning cable.

In a preferred embodiment, the tensioning cable is connected with one end to a first, preferably upper, blocker and with another end to a second, preferably lower, blocker.

In a preferred embodiment, the locking system comprises a pivoting body that is provided with at least one opening through which the tensioning cable runs; configured so that a rotation of the pivoting body bends this tensioning cable and thus moves the blocker to the retracted state.

In a preferred embodiment, the locking mechanism comprises, arranged between the blocker and the pivoting body, a supporting element for supporting the tensioning cable; preferably an opening or slot through which the tensioning cable runs.

In a preferred embodiment, the locking mechanism comprises a handle that is linked to the pivoting body and is configured to rotate the pivoting body.

In a preferred embodiment, the handle comprises a blocking mechanism that is configured to block the operation of the handle.

In a preferred embodiment, the locking system comprises a movement mechanism that is configured to bring about a movement of the movable object in the frame; wherein the movement mechanism comprises a holder, which has a passage with a first opening for mounting the blocker and a second opening for mounting the tensioning cable; and wherein the holder is mounted between the movement mechanism and the tensioning mechanism.

In a preferred embodiment, the tensioning mechanism comprises a spring system, such as a clamping spring, which is configured to clamp the holder against the movement mechanism.

In a preferred embodiment, the tensioning mechanism comprises an insertion slot that opens onto the spring system and/or a connecting piece that is connected to the spring system; wherein the holder comprises a stop that can be inserted in this insertion slot;

In a preferred embodiment, the stop is a flange.

In a preferred embodiment, the tensioning mechanism comprises an adjuster that is configured to adjust the distance between the tensioning mechanism and the movement mechanism by controlling the maximum tension range of the tensioning mechanism.

In a preferred embodiment, the adjuster comprises a rotatable element, such as a bolt, which when turned acts upon the spring system and/or the connecting piece.

One aspect of the invention relates to a door or window supporting system comprising: a frame and a movable object, such as a movable door or window, which is placed movably in the frame; and a magnetic locking system as described herein for releasably fixing the movable object to the frame, preferably at two or more different positions of the movable object relative to the frame.

One aspect of the invention relates to a use of a door or window supporting system as described herein as a partition, wall, door, window or closure for closing a living space, such as a balcony, veranda or terrace, preferably a sliding door or sliding window.

One aspect of the invention relates to an assembly for a movable door or window system comprising:

- a frame and a movable object, such as a movable door or window, which is mounted movably in the frame; and,
- a magnetic locking system according to one aspect of the invention for releasably fixing the movable object to the frame.

According to one aspect of the invention, a method is provided for assembling a magnetic locking system according to one aspect of the invention for releasably fixing a movable object to a frame, comprising the following steps:

- (a) providing the movable object that is configured to be mounted movably in the frame; wherein the movable object comprises a locking mechanism;
- (b) mounting at least one stop element to a top and/or bottom of the frame;
- (c) mounting a movement mechanism (40) that is configured to bring about a movement of the movable object (10) relative to the frame (20), wherein the movement mechanism (40) comprises a holder (400), which has a passage (410) with a first opening for mounting the blocker (100) and a second opening for mounting a tensioning cable (310) connected to the blocker (100); and mounting the holder (400) between the movement mechanism (40) and the movable object (10);
- (d) mounting a tensioning cable in the locking mechanism;
- (e) mounting a blocker to the corresponding top and/or bottom of the movable object and connecting the blocker to the tensioning cable.

According to one aspect of the invention, a use of a magnetic locking system according to one aspect of the invention is provided for releasably fixing a movable object to a frame.

According to a preferred embodiment, the movable object is preferably fixed releasably to the frame at two or more different positions of the movable object relative to the frame.

DESCRIPTION OF THE FIGURES

For better illustration of the features of the invention, some preferred embodiments of the present invention are described in the appended figures, without any limiting character.

The following numbering is adopted throughout the figures, claims, and examples: magnetic locking system (50); movable object (10); blocker (100); frame (20); stop element (200); recess (210); mounting element (220); locking mechanism (30); tensioning cable (310); tensioning mechanism (320); insertion slot (321); spring system (325); connecting piece (326); adjuster (327); mounting element (328); pivoting body (330); handle (340); supporting element (350); movement mechanism (40); holder (400); opening (410); stop (420); roller (450). The figures and numerical references are discussed in more detail in Example 1.

DETAILED DESCRIPTION

Figure 1:
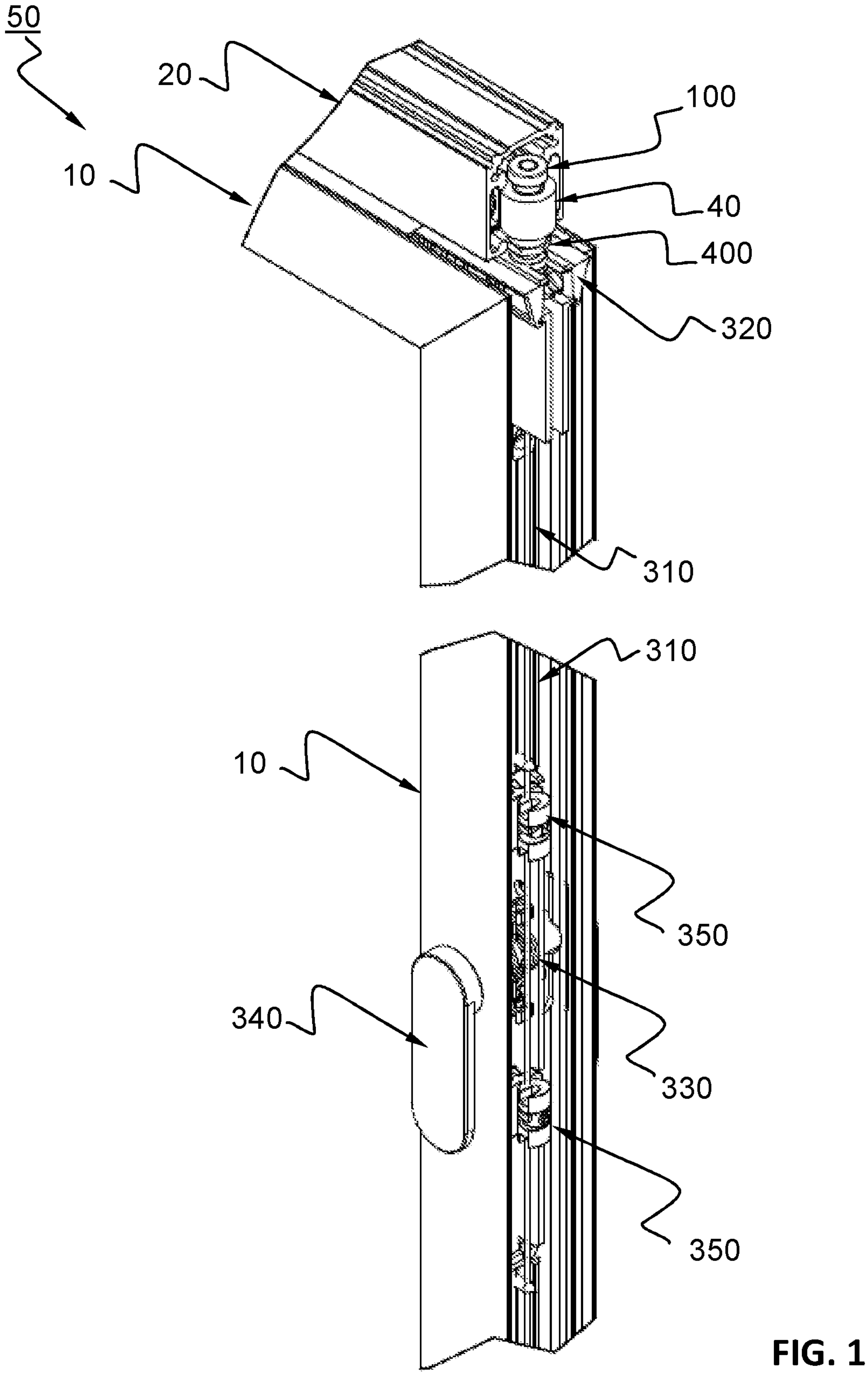
FIG. 1 is a perspective drawing of the magnetic locking system (50) described herein.

Before the present system and method according to the invention are described, it has to be understood that the present invention is not limited to specific systems and methods or combinations described, since such systems and methods and combinations may naturally vary. It is also to be clearly understood that the terminology used herein is not intended as limiting, since the scope of the present invention is only limited by the appended claims.

All documents cited in the present specification are incorporated herein in their entirety by reference.

As used hereinafter in this text, the singular forms “a” and “the” comprise both the singular and the plural unless the context is clearly otherwise.

The terms “comprise”, “comprises” as used hereinafter are synonymous with “inclusive”, “include” or “contain” “contains” and are inclusive or open and do not exclude additional, unnamed members, elements or method steps. The terms “comprise”, “comprises” include the term “contain”.

The enumeration of numerical values using a range of numbers comprises all values and fractions in these ranges, as well as the stated end points.

The term “about”, such as used when referring to a measurable value such as a parameter, an amount, a duration, and so on, is intended to include variations of ±10% or less, preferably ±5% or less, more preferably ±1% or less, and even more preferably ±0.1% or less, above and below the specified value, insofar as the variations are applicable for functioning in the invention described herein. It is to be understand that the value to which the term “about” refers per se, was also made known.

Various aspects of the invention are further defined in the following passages. Each aspect thus defined may be combined with another aspect or aspects, unless the contrary is clearly stated. In particular, a feature indicated as “preferred” or “advantageous” may be combined with other features or properties that are stated as “preferred” and/or “advantageous”. Reference in this specification to “one embodiment” or “an embodiment” signifies that a certain function, structure or feature described in connection with the embodiment is applicable in at least one embodiment of the present invention. When the phrases "in one embodiment" or "an embodiment" are stated at various points in this specification, they do not necessarily refer to the same embodiment, although this is not excluded. Moreover, the features, structures or characteristics described may be combined in any suitable manner, as will be clear to a person skilled in the art on the basis of this description. The embodiments described, and claimed in the claims, may be used in any combination. In the present description of the invention, reference is made to the appended drawings, which form a part thereof, and which illustrate specific embodiments of the invention. Numbers in parentheses or in bold linked to certain elements illustrate the respective elements as an example, without limiting the elements thereby. It has to be understood that other embodiments may be used and structural or logical changes may be made while remaining within the scope of the present invention. The following detailed description should not be regarded as limiting, and the scope of the present invention is defined by the appended claims.

Unless defined otherwise, all terms made known in the invention, including technical and scientific terms, have the meaning as usually understood by a person skilled in the art. As further guidance, definitions are adopted for further explanation of terms that are used in the description of the invention.

In order to satisfy the needs and shortcomings of the prior art described above, the inventors have developed methods and means for a door or window supporting system. In particular, the present invention relates to a magnetic locking system for fixing a movable object, such as a movable door or window, which is placed movably in a frame. The movable object may for example be placed slidably in the frame to form a sliding door or window. The movable object may for example be placed tiltably in the frame to form a tilting door or window.

A first overview of various aspects of the magnetic locking system is given hereunder, and then specific embodiments are described in more detail. This first overview is intended to help the reader to understand the structural concepts more quickly, but is not intended to identify the most important or essential features thereof, nor is it intended to limit the scope of the invention described.

FIG. 1 shows an example of a preferred embodiment of the magnetic locking system 50 that for the most part is incorporated in a frame of a movable object 10. The movable object 10 is placed against an inner wall of a frame so that it can move for example in the longitudinal direction of the frame. As an example, a movement mechanism 40 may be mounted in the frame 20, which comprises a plurality of wheels 450 for moving the object 10. It is clear that according to the embodiment example shown, the movement mechanism 40 is configured to allow the movable object 10 to be moved along the longitudinal axis of the frame 20, for example by means of the wheels 450 or other suitable guiding means. It is also clear that according to the embodiment example shown, the part of the frame 20 in which the movement mechanism 40 is mounted comprises an elongated profile that is mounted above the movable object 10—according to the embodiment example shown, a sliding door or sliding window. It is also clear that according to the embodiment example shown, this elongated profile of the frame 20 encloses a cross section of the movement mechanism 40 substantially completely, or completely, or in other words that the movement mechanism 40 moves in the longitudinal direction of the elongated profile of the frame 20 substantially completely or completely within the elongated profile of the frame 20. It is clear that alternative embodiment examples are possible in which the movement mechanism 40 is located and/or moves within the frame. According to the embodiment example shown, this profile comprises an substantially U-shaped or U-shaped cross section, the opening of which is directed toward the movable object 10, so that a connection can be made between the movable object 10 and the movement mechanism 40. As will be explained in more detail hereunder, according to the embodiment example shown, the movement mechanism 40 is mounted on the movable object 10 by means of for example a connecting piece 320, which for example can function as a tensioning mechanism 320, as explained in more detail hereunder, or any other suitable connecting piece, and a holder 400, which is mounted between this connecting piece 320 and the movable object 10. It is clear that alternative embodiments are possible in which the holder 400 is mounted to the movable object 10 in some suitable way other than with the connecting piece 320 or the tensioning mechanism. It is clear that preferably the holder 400 is mounted onto or into the movable object 10, or in other words onto or into the perimeter of the movable object 10 that is located opposite the frame 20. In other words, preferably the holder 400 is mounted between the movable object 10 and the movement mechanism 40. In other words, the holder 400 is mounted in such a way that it thereby bridges over the distance between the perimeter of the movable object 10 and the adjacent part of the frame in which the movement mechanism 40 is mounted. This is particularly advantageous in the case of a movable object 10 such as a sliding window or a sliding door, because, as will be described in more detail hereunder, in this way the blocker 100 mounted in the holder 400 is shielded from undesirable manipulation. This is also advantageous since the holder 400 for the blocker 100 can be aligned well, by means of the movement mechanism 40 mounted in the frame 20, with respect to the stop elements 200, which are also mounted in this frame 200. It is clear that in addition a more robust engagement of the blocker 100 on the stop element 200 can be achieved, owing to this good alignment and the small distance that must be bridged over by the blocker 100 up to the stop element 200. The holder does not consist of a ferromagnetic material; the holder consists for example of aluminum, plastic, etc.

As shown, the locking system 50 comprises a blocker 100 that can be mounted in the frame at the level of the movement mechanism 40 and is held in a desired position by a combination of a tensioning cable 310 and a tensioning mechanism 320, which will be discussed in more detail hereunder. As also shown, this tensioning cable 310 runs in the vertical direction through the frame of the movable object 10 along a pivoting body 330 that is configured to act upon the tensioning cable 310 when rotated. The pivoting body 330 can be rotated between at least two states by adjusting the position of the handle 340.

Figure 2:
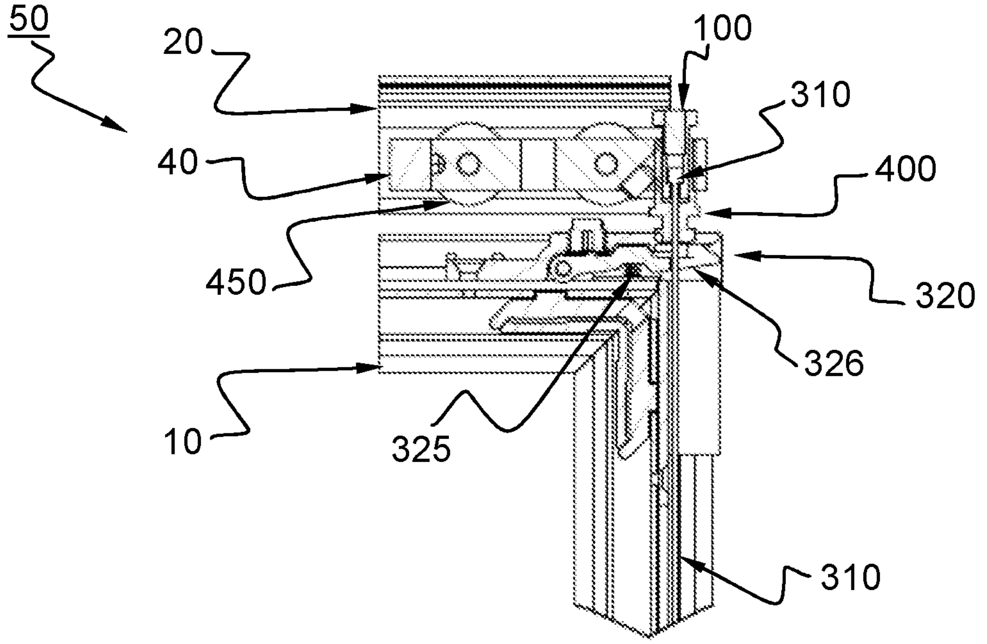
FIG. 2 is a cross section of the magnetic locking system (50) described herein.
Figure 2:
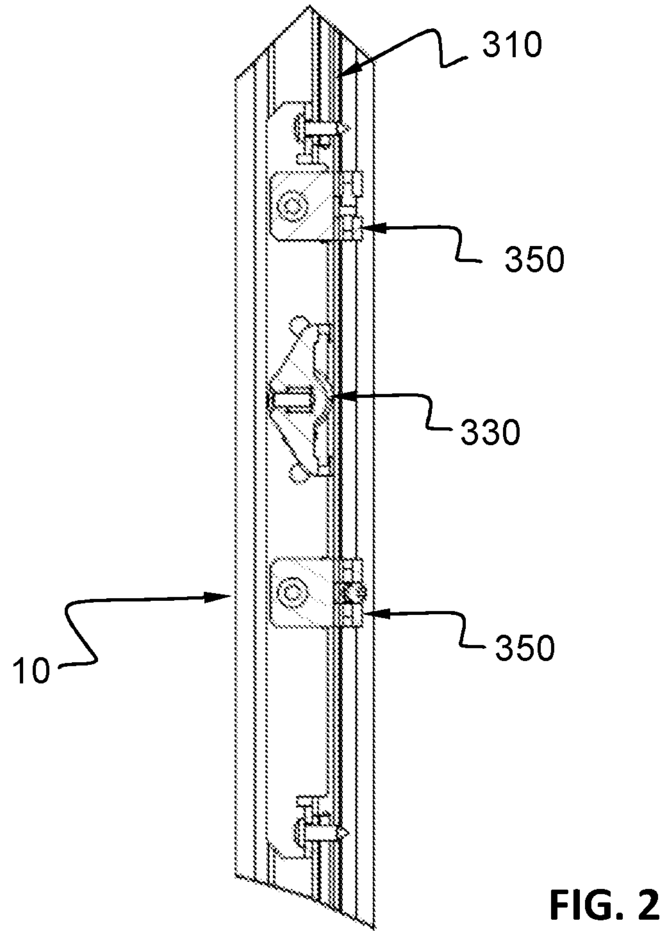
Figure 3:
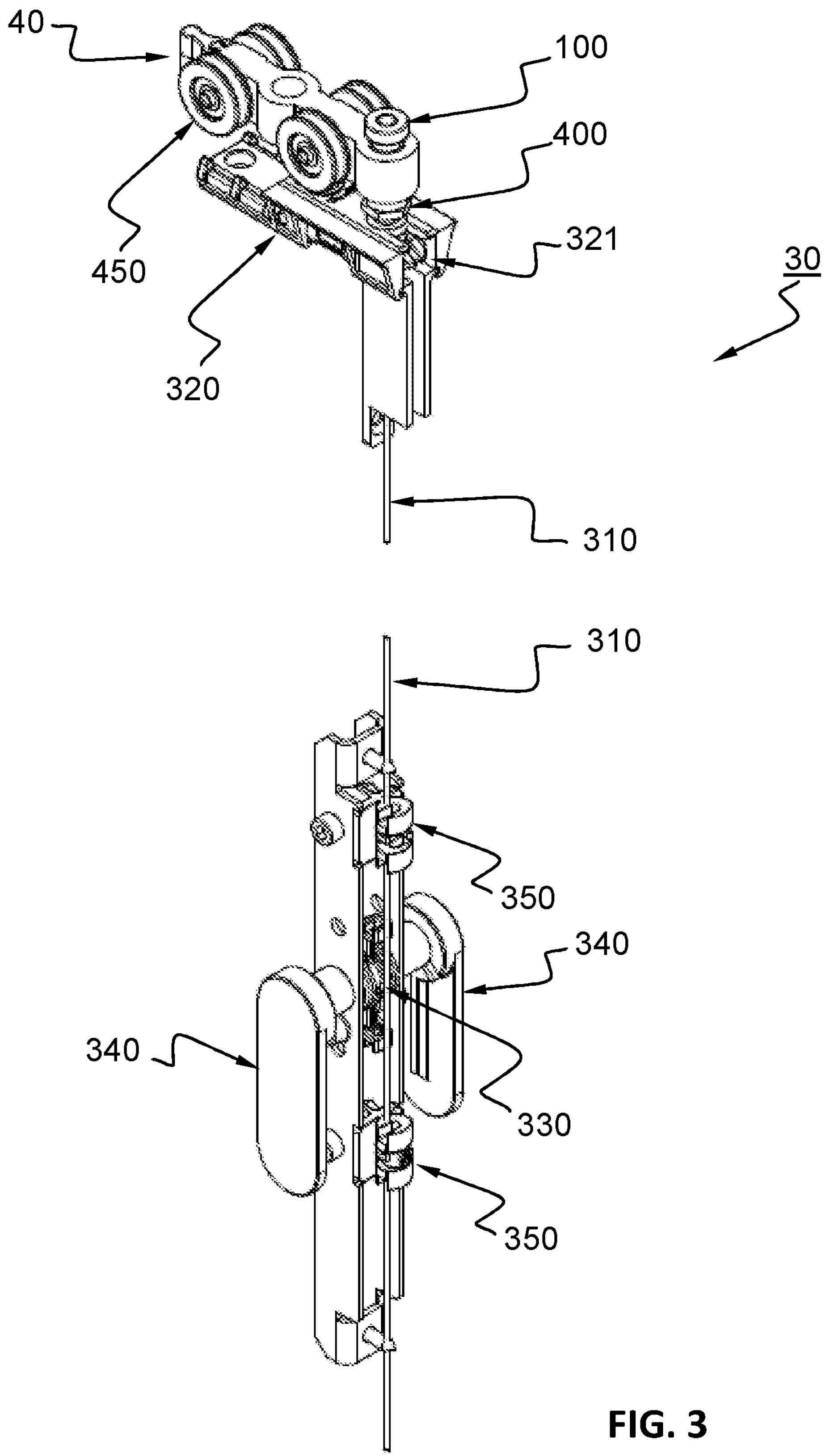
FIG. 3 is a perspective drawing of the locking mechanism (30) described herein.
Figure 9:
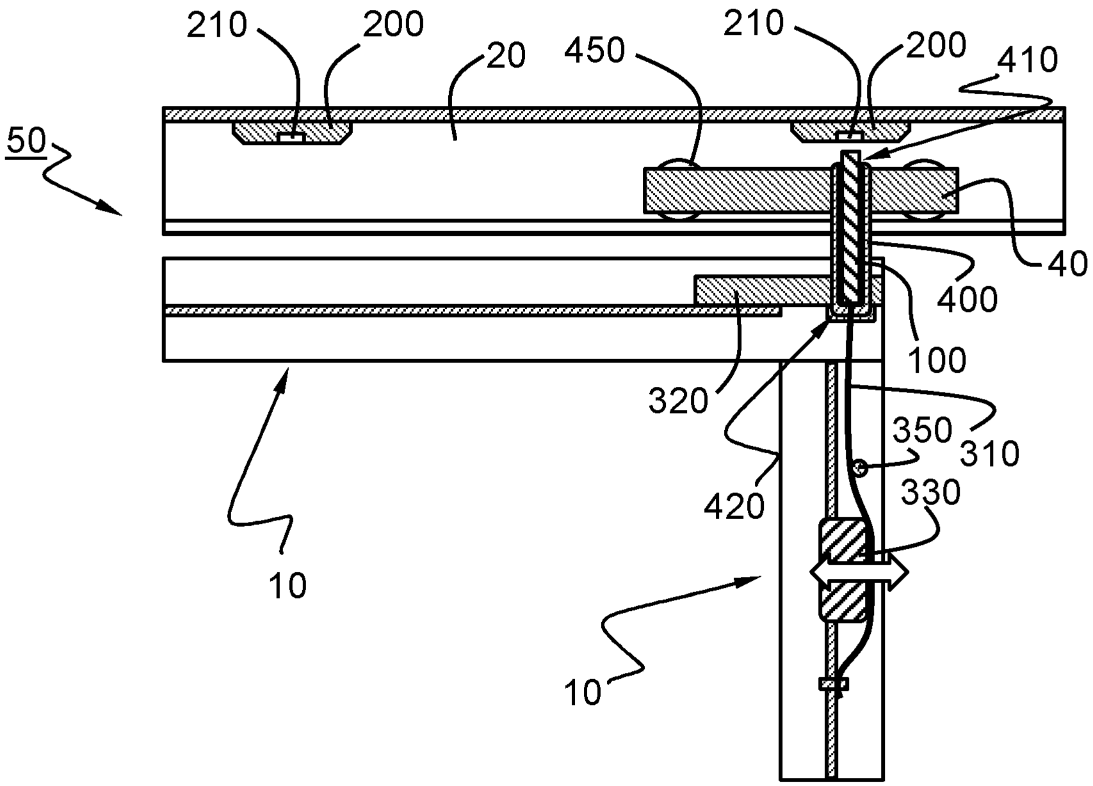
FIG. 9 is a cross section similar to FIG. 2, of an alternative embodiment.

Referring to FIG. 2, the locking mechanism 30 is explained further. As shown, the blocker 100 is mounted in a holder 400 along an open end thereof. This holder 400 is clamped between on the one hand an end of the movement mechanism 40 and on the other hand an end of the tensioning mechanism 320. As shown in FIG. 3, the holder 400 is slid into the tensioning mechanism 320 along an insertion slot 321, which is provided on one side of the tensioning mechanism 320. The tensioning mechanism 320 comprises a clamping spring 325, which is linked via a connecting piece 326 to an underside of the holder 400. According to the assembly shown, the clamping spring 326 can place the holder 400, as well as the blocker 100 and the movement mechanism 40, in a desired position. It is clear that according to alternative embodiments, similar to that shown in FIG. 3, the holder 400 can be mounted to the tensioning mechanism 320 in any suitable manner. The tensioning mechanism 320 may, according to particular embodiments, be made as a connecting piece 320 that mounts the holder 400 on the movable object 10, for example as shown in FIG. 9, in which similar elements are indicated with similar references and function in a similar manner as described for the other embodiments. This connecting piece 320 may, according to particular embodiments, be made without a tensioning mechanism for the tensioning cable 310 and for example may mount the holder 400 on the movable object 10. According to the embodiment example shown in FIG. 9, it is clear that the tensioning cable 310 may be attached at one end for example to the movable object 10, for example to an elongated profile that forms the perimeter of the movable object 10. As shown schematically, a sliding body 330 or a body 330 moving in some other suitable manner, similar to the pivoting body 330 described above, can move between at least two states. It is clear that yet other alternative embodiments are possible of a locking component that for example comprises said moving body 330. According to the embodiment example shown, in a first state the tensioning cable 310 will be able to move unhindered along the moving body 330 so that the blocker 100 is free to move from the retracted state to an extended state. In a second state, as shown in FIG. 9, the moving body 330 will act upon the tensioning cable 310 so that this is under higher tension, so that a movement of the blocker 100 will be limited to the retracted state. It is clear that further embodiments are possible, in which the holder 400 is mounted to the movable object 10 in any other suitable manner, for example directly, making use of a suitable connecting piece 320, or any other suitable mounting element. It is clear, moreover, that according to such embodiments the holder is attached or is mounted between the movable object 10 and the movement mechanism 40 in the frame 20. In other words, the holder 400 mounts the movable object 10 to the movement mechanism 40 in the frame 20. It is thus clear that the holder is mounted between the movement mechanism 40 and the movable object 10, or in other words that the holder 400 extends between the movable object 10 and the movement mechanism 40. It is thus clear that in this way the holder 400 bridges the gap between the frame 20 and the movable object 10, and thereby shields the blocker 100 in this gap. It is also clear that according to the embodiment example shown, the frame 20 is mounted above the movable object 10. It is also clear that the stops 200 are positioned in the frame 20 higher than the holder 400 mounted in the movement mechanism. It is also clear that in such an embodiment the blocker 100 returns automatically to the retracted state under the effect of gravity when the distance between the stop 200 and blocker 100 is large enough, so that the force of gravity is greater than the force of magnetic attraction.

As shown in FIG. 2, the holder 400 is further provided with an opening 410 through which a tensioning cable 310 can run, which is attached at one end to the blocker 100. The tensioning cable determines the extent to which the blocker 100 can move in the holder 400. According to the assembly described above, the tensioning mechanism 320 will tension the tensioning cable 310, by placing the holder 400 in a desired position. The tensioning cable 310 may be connected at the other end (not shown in the figures) to a component of the locking mechanism 30 or to another blocker 100, which is similarly arranged movably in an opening provided in the lower side wall of the movable object 10.

As described above, the pivoting body 330 can rotate between at least two states. In a first state the tensioning cable 310 will be able to run unhindered along the pivoting body 330 so that the blocker 100 is free to move from the retracted state to an extended state. In a second state the pivoting body 330 will act upon the tensioning cable 310 so that the latter is under higher tension, so that movement of the blocker 100 will be limited to the retracted state. It is clear that in this way the pivoting body 330 forms an embodiment of a locking component that is configured to switch the locking mechanism 30 selectively between the first state and the second state by acting upon the tensioning cable 310.

According to the assembly shown, the movement of the blocker 100 in the retracted state can be limited selectively between the two states described above, in particular: a first state in which the blocker 100 is free to move to the extended state; and a second state in which the blocker is held in the retracted state.

According to the assembly shown, the movement of the blocker 100 in the extended state can be adapted selectively between the two states described above, in particular: a first state in which the blocker 100 can remain in the extended state; and a second state in which the blocker will move to the retracted state.

FIG. 2 shows an embodiment of the pivoting body 330, which comprises two projections, each of which is provided at one end with an opening through which the tensioning cable 310 runs. On rotation of the pivoting body 330, the tensioning cable 310 will be pushed/pulled sideways by these projections and consequently bend, so that the length of the tensioning cable 310, i.e. the portion running between the pivoting body 330 and the blocker 100, is as it were limited. The tensioning cable 310 will thus bring and/or hold the blocker 100 to or in the second state described above.

Figure 4:
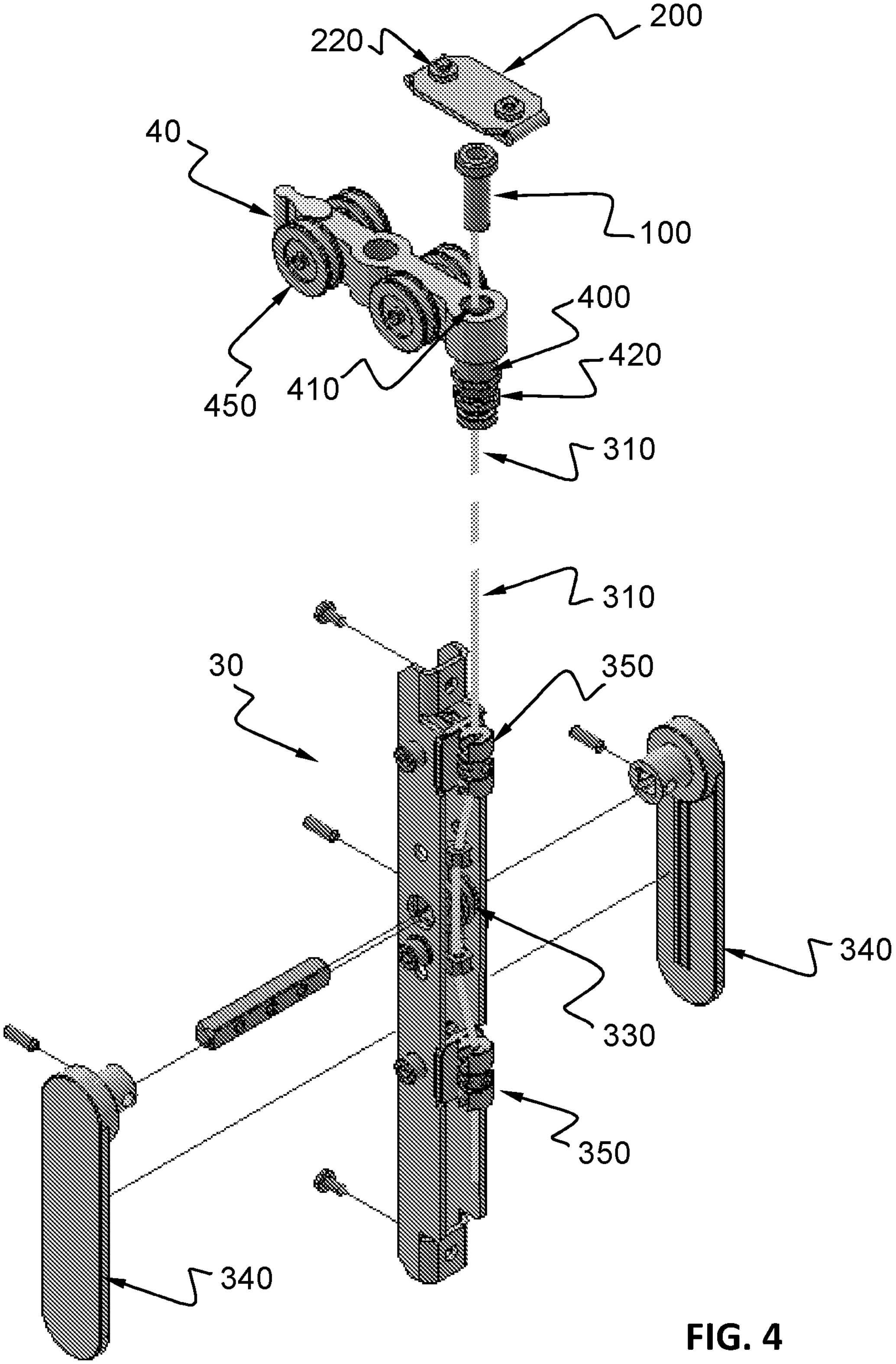
FIG. 4 is an exploded view of the locking mechanism (30) described herein.

Referring to FIG. 4, it is shown that the locking system 50 further comprises a stop element 200, which can be incorporated at one or more desired stop positions in the frame. The stop element 200 may for example comprise a plate that is bolted to an inner wall of the frame 20, along which the movement mechanism 40 can move. According to the embodiment example shown, the stop element 200 may be mounted by means of for example suitable mounting elements 220 inside the frame 20, but it is clear that according to alternative embodiments, any suitable elements or connections may be used for mounting the stop element 200 on the frame, for example such as other suitable screw elements, connecting elements, a glued joint, etc. The stop element 200 is configured to fix the blocker 100 when this is moved till at the stop element 200 and is free to move to an extended position. The stop element 200 may be provided with a recess 210, such as a notch or slot, in which the blocker 100 can move at least partially. An example of a suitable recess 210 is for example shown in FIG. 7. As a result, blocking will be achieved for fixing the movable object 10 mechanically to the frame 20.

Movement of the blocker 100 in the recess 210 can be brought about by providing magnetic attraction between on the one hand the blocker 100 and on the other hand the stop element 200. As an example, the blocker 100 may comprise a magnet and the stop element 200 may comprise or be made of a magnetically attractable material. The magnetic attraction will thus ensure that the blocker 100 moves to the extended state, i.e. moves into the stop element 200. Then the magnetic attraction may be interrupted by bringing the blocker 100 to a retracted state by means of the locking mechanism 30 described above. According to a particular embodiment, the stop element 200 with the recess is preferably mounted in such a way that around the recess, in the direction of movement of the movable object, there is magnetically attractable material, which is located at a smaller distance from the movable object 10 than the recess from the stop element 200. It is clear that, preferably, on approach of the stop element 200, first the blocker 100 will be attracted magnetically to this edge of the stop element 200 next to the recess 210. Since this edge is closer to the blocker 100 than the recess, the magnetic attraction will be stronger, and the distance that must be bridged by the blocker 100 up to the stop element 200 will be smaller than the distance to the recess. It is clear that then, with further movement of the blocker 100 in the direction of the recess by means of a movement of the movable object 10 along the frame 20, for example such as along the longitudinal direction of the elongated profile of the frame 20 as shown in the figures, the blocker 100 already attracted magnetically toward the stop element 200, on reaching the recess 210, will enter the recess 210 more quickly and easily on the basis of the magnetic attraction to the stop element 200, since the additional distance that must be bridged over by the blocker 100 toward this extended state is also more limited than the distance between the completely retracted and the completely extended state. This offers the advantage that a connection between the blocker 100 and the stop element 200 can be achieved robustly and reliably, preferably by means of the movement of the movable object alone without requiring an additional action or manipulation. This is advantageous when the stop is used for example in an intermediate position along the longitudinal direction of a frame or guide rail of a sliding door or sliding window, since even at higher speeds of movement of the movable object 10, locking can be achieved with certainty at the desired position of the stop 200. According to a preferred embodiment, the distance to the recess 210 from the blocker 100 in the retracted state is so large that the blocker 100 is not moved to the stop 200 on the basis of magnetic attraction from the first, disconnected state, when the stop 200 is located opposite the recess 210. This makes it possible, particularly in the case of a stop 200 that is located above the blocker 100, on unlocking the magnetic locking system 50 by releasing the blocker 100 from the recess 210 in the stop 200 by bringing the blocker to the retracted state with the locking mechanism 30, the blocker 100 will not be moved back by magnetic attraction to the stop 200 as long as it is still located at the level of the recess. This offers the advantage that a simple locking mechanism 30 may be used, wherein means need not necessarily be provided or a correct further operation of the locking mechanism 30 is necessary to keep the blocker 100 in the retracted position so that then the movable object 10 can be moved away from the position in the frame determined by this stop 200.

For further explanation of the advantages and further adaptations to the invention, specific embodiments of the magnetic locking system are described in more detail hereunder. A person skilled in the art will understand that the aspects described herein may be combined with each other, unless stated otherwise. Thus, a particular embodiment of a specific aspect may also be viewed as an embodiment of another aspect without express discussion thereof. For example, an embodiment of the locking system forms also an embodiment for the production of said locking system, the use of said locking system, and so on.

One aspect of the present invention relates to a magnetic locking system for releasably fixing a movable object, such as a movable door or window, to a frame. In one embodiment, the locking system comprises at least one stop element mounted to the frame; at least one blocker mounted to the movable object, configured to be moved between: a retracted state configured to allow the blocker to move unhindered past the stop element; and an extended state configured to secure the blocker on the stop element when the blocker is moved till at the stop element; a locking mechanism mounted to the movable object and connected to the blocker, configured for selectively: in a first state, disconnecting the blocker to move it to the extended state; and in a second state, bringing and/or keeping the blocker in the retracted state, and wherein the blocker comprises a magnet and the stop element comprises a magnetically attractable material, and/or vice versa; configured so that in the extended state, the blocker is fixed to the stop element by attraction of the magnet toward the magnetically attractable material. It is clear, moreover, that according to preferred embodiments, the magnetic locking system 50 is configured for releasably fixing the movable object 10 to the frame, wherein the movable object 10 always remains connected to the frame 20. For example, with releasable fixing of a sliding door or sliding window to a frame 20, the magnetic locking system 50 is configured to fix the sliding door or sliding window releasably at one or more positions along the longitudinal axis of the frame 20, wherein in the retracted state of the blocker 100 the sliding door or sliding window may be moved in the longitudinal direction of the frame 20 past the one or more stop elements 200, and wherein in the extended state of the blocker 100, movement of the sliding door or sliding window in the longitudinal direction of the frame 20 is prevented at the level of one of the one or more stop elements 200. It is clear that, for example as shown in FIG. 9, according to particular embodiments, wherein several stop elements 200 are used in the longitudinal direction of a frame 20 of a sliding window or sliding door, the magnetic locking system 50 is configured so that the sliding window or the sliding door may be locked at various corresponding positions along the longitudinal direction of the frame 20 by fixing the blocker 100 of the sliding window to a stop element corresponding to this position.

The magnetic locking system described herein has the advantage that it allows reliable and user-friendly locking of a movable object without this requiring complex operations or settings. In one embodiment, the user may choose to activate the locking mechanism regardless of the present position of the object, for example when the door or window is completely or partially open, so that this will be fixed automatically during closure. In a further embodiment the user may also choose to fix the object at various positions in the frame, for example when several movable objects are connected together sequentially to achieve partial closure of the movable object.

The magnetic locking system described herein may also limit the number of movable components that are necessary to bring about locking, which reduces the complexity of the system and limits the likelihood of defects or wear. This may offer a durable solution for extending service life. In one embodiment, the locking may also be brought about more quickly and more flexibly than in systems in the prior art.

The locking system described herein may also be concealed more easily for a more aesthetic looking finish of the object and/or frame. In particular, the components of the present locking mechanism can be incorporated completely in a wall of the object and/or frame. This may give a user the impression that a continuous wall has been produced, i.e. without interruptions consisting of slots or projections. This may also improve the heat loss of the system, as there are fewer openings that promote heat transfer.

The locking system described herein can be produced in a single-sided configuration, wherein a top or bottom of the object is fixed to the frame, and a double-sided configuration, wherein both the top and the bottom of the object are fixed to the frame. The double-sided configuration may fix the object more sturdily, but logically also increases the design complexity. A person skilled in the art will appreciate that these single-sided and double-sided embodiments are illustrative, and the locking system may in principle also be adapted to more complex configurations.

In one embodiment, the present invention provides a single-sided locking system, wherein a top or bottom of the object is fixed to the frame or a guide. The single-sided locking system may comprise at least one blocker that is mounted to a top or bottom of the movable object and at least one stop element that is mounted to a corresponding top or bottom of the frame. The single-sided locking system may be provided with at least one stop element that is incorporated in the upper or lower guide of the frame, preferably in a concealed passage of the guide, corresponding to the position of the blocker in the movable object.

In one embodiment, the present invention provides a double-sided locking system, wherein both the top and the bottom of the object are fixed to the top and bottom of the frame or a guide. The double-sided locking system may comprise at least two blockers, wherein a first, upper blocker is mounted to a top of the movable object and a second, lower blocker is mounted to a bottom of the movable object; and at least two stop elements that correspond to a top and bottom of the frame are mounted. The stop elements may be incorporated at opposite positions in the frame or the guide, corresponding to the positions of the blockers in the movable object.

A frame, framing or framework as used herein refers to a rigid structure in which a movable object, such as a door or window, is placed. The frame will typically be fixed to a wall for support, so that it can close a living space, such as a balcony, veranda or terrace.

The inner wall of the frame may be provided with means for setting the movement of the movable object in operation. In one embodiment, the movable object may be provided with a sliding means that is in contact with the frame so that the object can slide relative to the frame. The frame may be provided with a guide, over which the object can move in the longitudinal direction of the frame. The object will typically move in a horizontal direction, but the present invention may also be applied for vertical sliding systems. In another embodiment the movable object may be provided with a tilting means, which is in contact with the frame so that the object can also tilt relative to the frame.

A person skilled in the art will appreciate that the locking mechanism described herein is not limited to a specific embodiment of the movement mechanism, such as the movement means or drive that is used. As an example, the locking mechanism may be employed with a suspended sliding system, wherein the movable object is "suspended" by two trolley hangers provided in the upper wall of the frame or a guide. As an example, the locking mechanism may be employed with a rolling sliding system, wherein the movable object is placed on wheels or bearings provided in the lower wall of the frame or a guide. The locking mechanism may be used both for indoor and outdoor applications.

The movable object as used herein refers to a door or window that is arranged movably in the frame. The movable object may for example be placed slidably in the frame to form a sliding door or window. The movable object may for example be placed tiltably in the frame to form a tilting door or window. A person skilled in the art will appreciate that the locking mechanism described herein is not limited to a particular embodiment of a door or window. Any reference to a door is also a reference to a window or similar movable object, and the preferred embodiments of a door described herein form equally preferred embodiments of a window. As an example, a door or window may be formed by one frame profile or several frame profiles coupled together. The object may optionally be provided with glazing.

The relative terms "left", "right", "in front", "behind", "above", "below", "over", "under", "central", "lateral", and the like in the present description are used for describing purposes and not necessarily for describing absolute positions. It will be understood that the terms used are mutually interchangeable in appropriate circumstances, depending on the orientation described, so that the embodiments described herein may for example also be used in orientations other than those illustrated and/or described herein. As an example, "lateral" may coincide with an upward, downward and/or sideways (for example to the left or right) position and/or direction.

The magnet relates to an object that produces a magnetic field. In one embodiment, a permanent magnet may be made from magnetic or magnetized material, such as magnetic metals or composites. A person skilled in the art will appreciate that the locking system is not limited to a specific type of magnet or magnetic material. In another embodiment, the magnet may be an electromagnet.

The blocker forms a suitable housing for a magnet, so that this magnet can be mounted movably in the movable object. The blocker may consequently also be described as a magnetic blocker. It should be clear that this is only one possible embodiment, which can easily be reversed, i.e. so that the stop element comprises a magnet and the blocker comprises a material that is suitable for being attracted by this magnet. A person skilled in the art is assumed to be capable of carrying out the necessary adjustments to the locking system described herein.

Referring to FIG. 4, a preferred embodiment of the blocker 100 is described. The blocker 100 may comprise an opening that is configured for mounting and fixing a magnet and/or a magnetically attractable material. It is advantageous if the diameter of this opening roughly corresponds to the diameter of the magnet and/or material so that the latter can be fixed sturdily. As is also shown, the blocker 100 may be attached to a tensioning cable 310 on either side of the opening. For this purpose, the blocker 100 may be provided with a attachment element, such as a hook, for securing one end of the tensioning cable 310.

The blocker may be made of a magnetic shielding material that blocks the magnetic field produced by the magnet so that the magnet cannot attract any nearby components of the system undesirably, such as screws. A person skilled in the art will appreciate that the provision of a blocker allows easier production and mounting of the locking system, but the magnet may in principle also be applied in an embodiment without a blocker, i.e. wherein the magnet itself forms the blocker.

The blocker may be placed in a holder provided on one side of the movable object so that it can be moved by the locking mechanism that will be discussed hereunder. In a preferred embodiment the blocker can move at least in a linear direction. This may allow the blocker to move between at least two states, in particular a retracted state, wherein the blocker moves in the central direction of the movable object, i.e. away from the frame, and an extended state, wherein the blocker moves in the lateral direction of the movable object, i.e. toward the frame. A person skilled in the art will appreciate that the distance between the retracted and extended state may be adjusted to the strength of the magnetic attraction and the height adjustment of the movement mechanism relative to the movable object.

The frame or a guide of the frame is provided with at least one stop element, which is configured for fixing the blocker in an extended state. This stop element may be made of a magnetic material or may comprise a magnetically attractable material, i.e. a material that is suitable for being attracted by the magnet. In one embodiment, the stop element may be made of a ferromagnetic material, such as iron, nickel and cobalt. In another embodiment the stop element may be made of a magnetic or magnetized material with an opposite polarity.

In one embodiment, the stop element may comprise a recess, such as a notch or slot, which is configured to at least receive and fix the blocker. The blocker may comprise a broadened head part that is provided at one end of the blocker, which fits at least partially and preferably completely in this recess. It is advantageous if the diameter of the recess roughly corresponds to the diameter of the blocker and preferably the head part of the blocker so that undesirable displacement can be prevented.

The stop element may be incorporated in the frame or a guide of the frame on the side that corresponds to the side of the movable object in which the blocker is provided. As a result, magnetic attraction may arise between the magnet provided in the movable object and the stop element provided in the frame, or vice versa. This attraction may cause the blocker to slide out so that this goes into the recess described above so that the movable object can be fixed, preferably by means of the movement mechanism, as will be discussed hereunder. A person skilled in the art will appreciate that the rest of the frame, i.e. which does not form part of the stop element, may preferably be made of nonmagnetic materials, such as polymers, to avoid unwanted magnetic attraction.

Figure 7A:
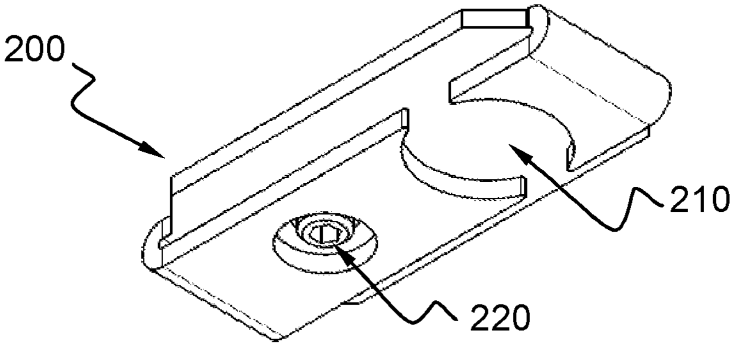
FIG. 7 are drawings of the stop element (200) described herein, in perspective (FIG. 7A), in top view (FIG. 7B) and as a sectional side view (FIG. 7C).
Figure 7B:
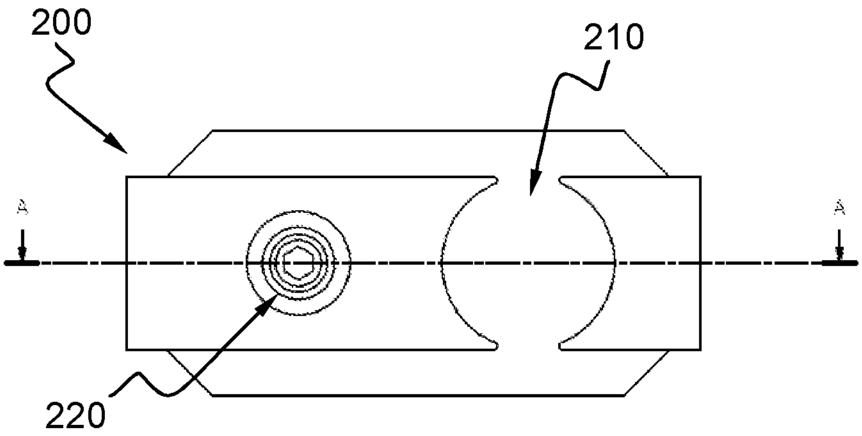
Figure 7C:
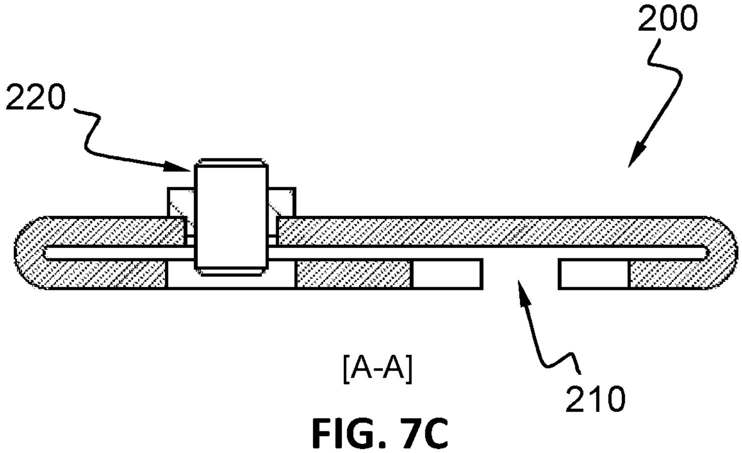

Referring to FIG. 7, a preferred embodiment of the stop element 200 is described. The stop element 200 may comprise an oblong plate with a recess 210, which is configured for applying and fixing the blocker as a result of magnetic attraction. As shown, the plate of the stop element 200 may be curved on either side so that a recess can be produced easily with a depth that corresponds to the angle of flexure of this plate.

In one embodiment, an opening may be provided in the stop element 200 for the placement of a mounting element 220 so that the stop element 200 can be mounted to one side of the frame. The mounting element may be for example a bolt or nut that is screwed into an opening in the frame, or a plate that is secured to a wall of the frame. This may allow the position of the stop element to be adjusted easily, when mounting the locking system, to the user's requirements or the configuration of the door or window supporting system. A person skilled in the art will understand that the stop element may also be secured to the frame in other ways or alternatively may be integrated therein.

As discussed above, the blocker can move between two states depending on the state of the locking mechanism. In the retracted state, the blocker will move past the stop element so that the movable object can move unhindered in the frame, and in an extended state the blocker will block the movement of the movement mechanism so that the movable object is fixed in the frame.

In one embodiment, a plurality of stop elements may be incorporated at various positions in the length of the frame. This may allow the movable object to be fixed at various positions, preferably determined by the user. Because the magnet is magnetically attracted automatically when it moves over a stop element, it is not necessary for a user to look for the position of the stop element, he only has to slide the movable object over the position of the desired stop element. This provides a system that is easy to use and that allows flexible locking of the movable object at several positions in the frame.

As described above, the movable object comprises a movement mechanism that is configured to bring about movement of the movable object in the frame. The movement mechanism may as an example comprise a sliding and/or tilting means in order to put into operation a displacement and/or tilting of the movable object relative to the frame. A person skilled in the art will appreciate that the locking mechanism described herein is not limited to particular movement means, directions and/or drives thereof.

In one embodiment, the movable object is provided with a sliding means to put into operation displacement of the object over the frame. The sliding means may for example comprise a plurality of wheels, rollers or bearings. The wheels may as an example be solid, as is typically provided for indoor applications, or hollow, as is typically provided for outdoor applications. The sliding means may be incorporated in the frame, preferably in a concealed passage provided in the upper and/or lower guide so that it can be completely hidden. A person skilled in the art will understand that when the sliding means and the at least one stop element are incorporated in the same sliding guide, these should not block each other unless this is desired.

In one embodiment, the blocker may be arranged movably in the movement mechanism so that in the lateral direction it can slide into a recess of the stop element. By connecting the blocker directly to the movement mechanism, the moving object can be fixed more efficiently because the displacement of the movement means can be blocked directly. Optionally, the displacement of the blocker may block further movement of the movement means, for example by preventing rotation of the wheels or rollers.

Figure 5A:
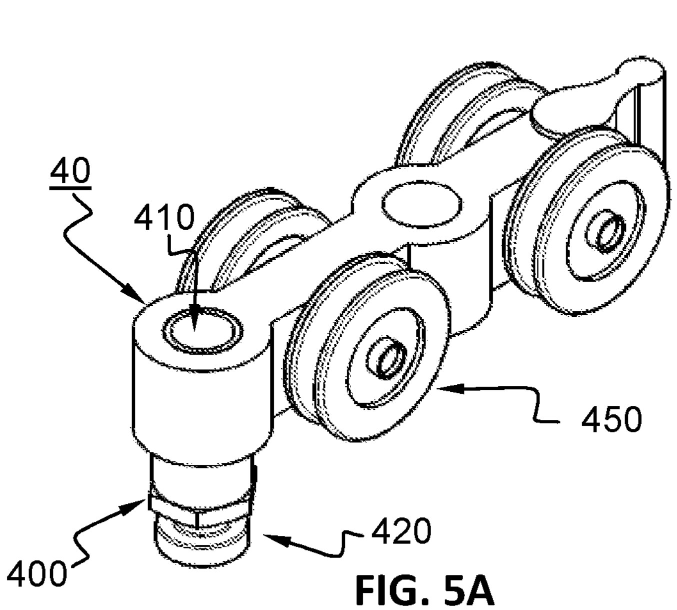
FIG. 5 are drawings of the movement mechanism (40) described herein, in perspective (FIG. 5A), in top view (FIG. 5B) and as a sectional side view (FIG. 5C).
Figure 5B:
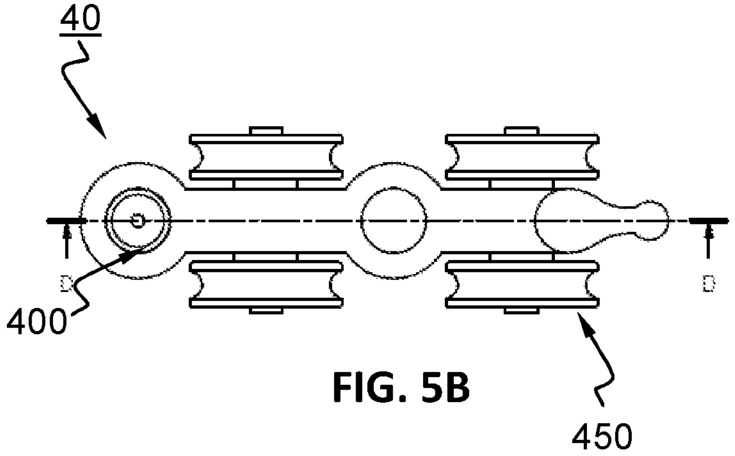
Figure 5C:
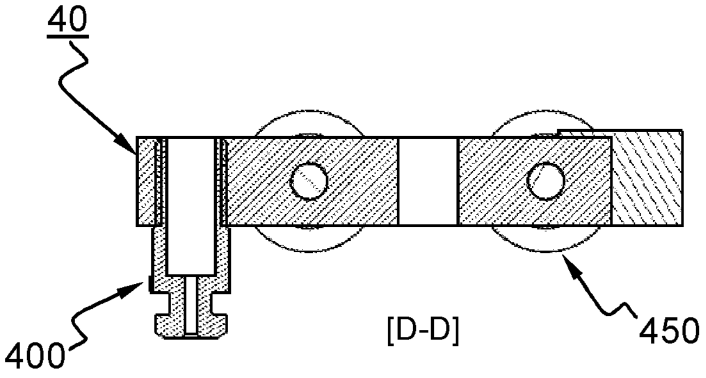

Referring to FIG. 5, a preferred embodiment of the movement mechanism 40 is described. The movement mechanism 40 may comprise an elongated body on which a plurality of sliding means are coupled rotatably. These sliding means are shown in this embodiment as a set of four wheels 40, which are arranged in pairs on either side of the blocker.

In a further embodiment, the locking system may comprise a holder that is configured to retain and optionally shield the blocker. The holder may be placed between the movement mechanism and the tensioning mechanism so that it cannot move. It is advantageous if the holder is clamped between on the one hand an end of the movement mechanism and on the other hand an end of the tensioning mechanism. Such an assembly may allow the height of the movement mechanism to be adjusted, as will be described in more detail hereunder.

Figure 6A:
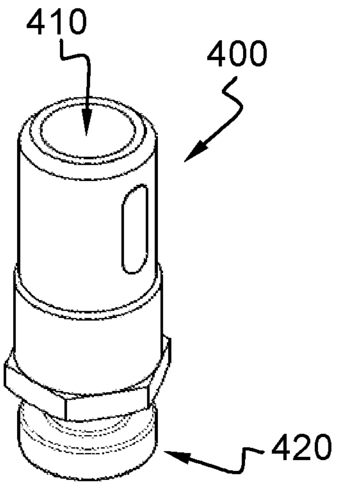
FIG. 6 are drawings of the holder (400) described herein, in perspective (FIG. 6A), in top view (FIG. 6B) and as a sectional side view (FIG. 6C).
Figure 6B:
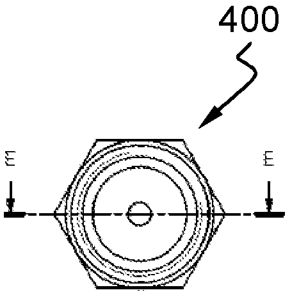
Figure 6C:
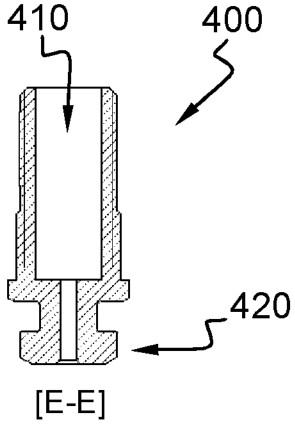

Referring to FIG. 6, a preferred embodiment of the holder 400 is described. The holder 400 may comprise a passage 410 with at least one open end, which is configured for mounting and fitting the blocker 100. It is advantageous if the diameter of this passage 410 roughly corresponds to the diameter of the blocker 100 so that the movement of the blocker can be limited to one axis, i.e. the blocker can only move linearly between a retracted state and an extended state. As is also shown, the passage 410 may have a second opening, preferably provided on either side of the holder 400 relative to the first opening, for mounting a tensioning cable 310 so that it can be attached directly to the blocker 100.

The holder 400 may also comprise a stop 420, preferably positioned on the opposite side of the blocker, which can be slid into an insertion slot 321 of a tensioning mechanism 320 described below, for mounting the holder 400. As shown, this stop 120 may form a flange. Sliding the holder 400 in may limit the movement of the blocker to one axis, so that the holder cannot move sideways.

As shown in FIG. 5, the holder 400 may partially be mounted in a passage provided on one side of the elongated body of the movement mechanism 40. The holder 400 may comprise a broadening, such as a flange that prevents the holder being able to move completely through this passage. This may allow easier adjustment of the blocker by the tensioning mechanism, which will be described in more detail hereunder, because the holder can be clamped between on the one hand the movement mechanism 40 and on the other hand the tensioning mechanism.

The locking mechanism comprises a device that is configured to alter the position of the blocker in the movable object between the retracted and extended states discussed above. The locking mechanism thus enables the user to choose whether the movable object is to be fixed or can move freely in the frame. Depending on the configuration, the locking mechanism may also enable the user to choose the position in which the movable object is fixed in the frame.

In a preferred embodiment, the locking mechanism comprises a tensioning cable, which is connected at one end to the blocker and is arranged in such a way that the movement of the blocker is limited in the preferably lateral direction; a tensioning mechanism that clamps the blocker in the extended state and therefore brings the tensioning cable under tension; and a moving component that acts upon the tensioning cable and therefore moves and preferably pulls the blocker to a retracted state.

The tensioning cable may have a length that corresponds to the desired position of the blocker in the extended state. The tensioning cable can be secured to a stationary component of the movable object, such as a profile wall or projection provided in the profile wall, or may be secured to a movable component that forms part of the locking mechanism.

In a preferred embodiment, the tensioning cable is connected on either side to two, preferably opposite, blockers. In particular, the tensioning cable may be connected at one end to a first, preferably upper, blocker and at the other end may be connected to a second, preferably lower, blocker. This may allow the position of these two blockers to be adjusted simultaneously with a single locking mechanism. This forms an especially efficient embodiment of a double-sided locking system without increasing its complexity. This may also ensure that the blockers are at an equal distance from the center of the movable object. This makes mounting of the locking system easier, because the position of each blocker does not have to be set separately.

The tension on the cable can be brought about by providing a tensioning mechanism that acts upon the blocker, and preferably pushes and/or pulls the blocker in the lateral direction. The tensioning mechanism is preferably mounted on one side of the movable object, between the movable object and the frame. In a preferred embodiment, the tensioning mechanism is mounted on an upper and/or lower wall of the movable object or the frame of the movable object. An opening may for example be provided in the tensioning mechanism for the placement of a mounting element such as a screw or bolt. In order to bring about tension, the tensioning mechanism may comprise a spring system, which is made of an elastic and/or springy material so that it is able to return to its original shape when it is bent, stretched or compressed. An example of a suitable spring system is a clamping spring.

In a preferred embodiment, the tensioning means may comprise a spring such as a clamping spring that is placed between a wall of the movable object and the blocker so that it pushes this blocker, and/or a connecting piece that is linked to this blocker, in the lateral direction, i.e. toward the frame. This forms an especially reliable embodiment for achieving locking with less likelihood of wear because friction between movable components is limited.

The resilience of the spring system may be adapted to the intensity of the load, for example depending on the length of the tensioning cable and the weight of the blocker. Depending on the choice of material, the spring system may be more stiff or rigid, or may be more flexible and elastic. A person skilled in the art is assumed to understand how the choice of material may affect the resilience of the spring system.

In one embodiment, the tensioning mechanism may comprise an adjuster that is configured to adjust the distance between the tensioning mechanism and the movement mechanism by controlling the maximum tension range of the tensioning mechanism. Because the tensioning mechanism is mounted to one side of the movable object, the height of the movement mechanism in the frame can be adjusted.

The adjuster may be adjustable for length and/or position, so that it can act upon the spring system described above and/or the connecting piece that is linked to the spring system. As an example, the adjuster may be a rotatable element, such as a bolt, that is configured to push on the spring system and/or connecting piece when turned. This provides an adjustable tensioning mechanism, which may reduce the complexity of the locking mechanism.

Figure 8A:
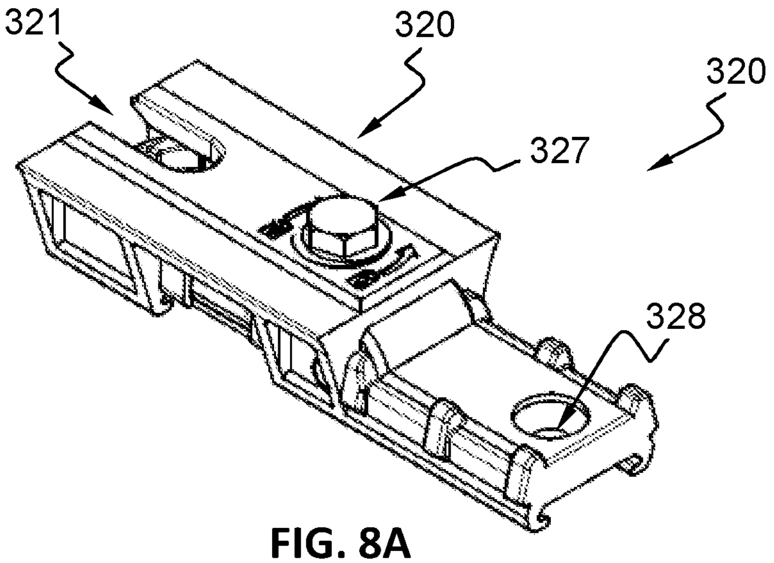
FIG. 8 are drawings of the tensioning mechanism (320) described herein, in perspective (FIG. 8A), in top view (FIG. 8B) and as a sectional side view (FIG. 8C).
Figure 8B:
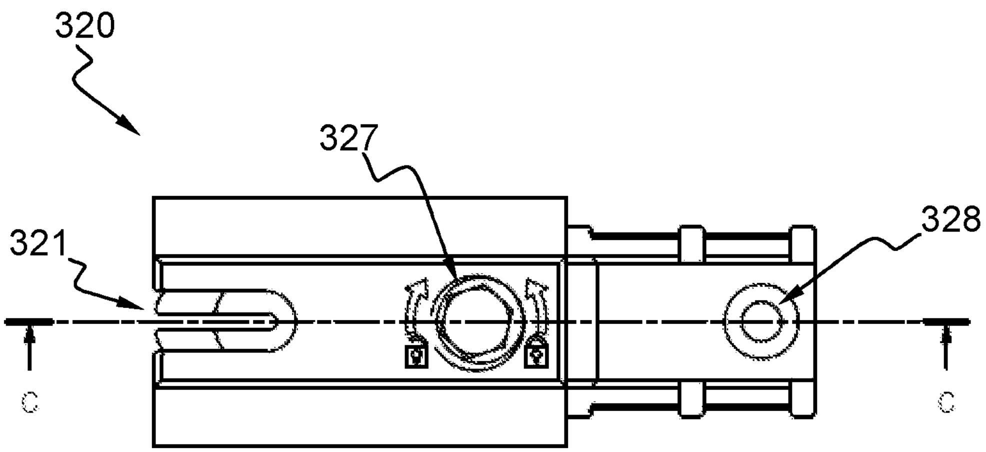

Referring to FIG. 8, a preferred embodiment of the tensioning mechanism 320 is described. The tensioning mechanism 320 may comprise an elongated body, which may be mounted on one side of the movable object. For this purpose, the blocker comprises an opening for the placement of a mounting element 328, such as a screw or bolt.

One side of the tensioning mechanism 320 may be provided with an insertion slot 321 for sideways insertion of the holder 400. The holder 400 preferably comprises a stop 420, as shown earlier in FIG. 6, with a transition that can be slid into the insertion slot 321. Through insertion of the holder 400, this can be coupled to the tensioning mechanism so that it is secured in the sideways direction, but can still move vertically, i.e. in the direction between the tensioning mechanism 320 and the movement mechanism 40.

Figure 8C:
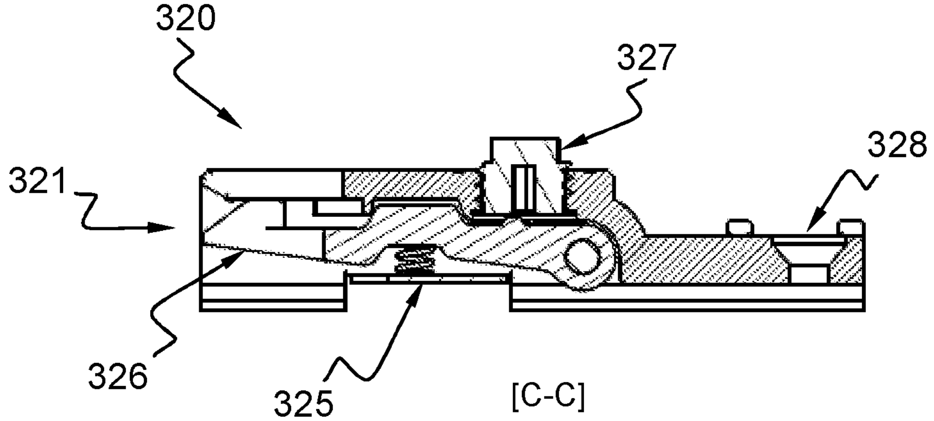

As shown in FIG. 8C, a connecting piece 326 is provided, which is positioned with a first end in the insertion slot and at another position is linked to a clamping spring 325 to form a lever. As a result, the clamping spring 325 can push the retracted blocker 100 via the connecting piece 326 in the lateral direction.

As also shown in FIG. 8C, the connecting piece 326 is additionally connected to an adjuster 327, which partially or completely blocks the movement of the connecting piece 326 in the central direction, i.e. depending on the setting of the adjuster 327. As shown in FIG. 8A, the position of the adjuster 327 can be regulated rotatably.

The locking mechanism may comprise a handle that is linked to a pivoting body. The handle may be configured to rotate the pivoting body when activated, for example by turning or pushing in. A person skilled in the art will appreciate that other rotating mechanisms exist, and the handle only represents an illustrative embodiment that is simple to use and limits the complexity of the locking mechanism. The pivoting body may be arranged so that on rotation it acts upon the tensioning cable, for example by bending the tensioning cable. The pivoting body may for example be provided with a projecting component, such as an edge or gripper, which grips the tensioning cable and therefore pulls and/or holds the blocker in a retracted state.

In one embodiment, the handle may comprise a blocking mechanism that is configured to block the operation of the handle. The blocking mechanism may for example be a hook or lock that secures this handle in a certain state. As a result, the movable object can be secured to the frame more sturdily.

In one embodiment, the pivoting body is provided with an opening through which the tensioning cable runs. This will ensure that on rotation, the tensioning cable partly bends so that it is displaced to or from the pivoting body, i.e. is pulled or pushed partially sideways. It is to be understood that when the pivoting body acts upon the tensioning cable this is bent in a sideways direction. As a result, the length of the tensioning cable between the pivoting body and the blocker will be shortened, so that the blocker is pulled toward the pivoting body, i.e. to the retracted state. It is clear that such a locking mechanism can also interact with a tensioning cable which at one end is connected to the blocker 100 and at its other end is secured to the movable object 10. It is clear that such a locking mechanism may also interact with a tensioning cable that at one end is connected to a blocker 100 that is connected at one end of the movable object and at its other end is secured to a blocker 100 at an opposite end of the movable object 10. It is clear that embodiments of such mechanisms without a tensioning mechanism for tensioning the tensioning cable are possible. According to such embodiments, the blocker 100 may be held in the retracted state through action of the locking mechanism on the cable, and/or for example by gravity when the blocker 100 is not attracted by the stop element 200.

In a preferred embodiment, the locking mechanism may be incorporated in the movable object completely. The movable object may be provided with a hollow framework that provides a space for placement and mounting of the locking mechanism.

One aspect of the present invention relates to an assembly for a movable door or window system comprising a frame, optionally provided with a guide, and a movable object, such as a movable door or window, which is mounted movably in the frame; and a magnetic locking system as described herein for fixing the movable object to the frame or optionally to the guide. It is to be understood that preferred embodiments of the magnetic locking system as described herein also form preferred embodiments of the door or window supporting system.

One aspect of the present invention relates to a use of the magnetic locking system described herein for fixing a movable object in a frame. It is to be understood that preferred embodiments of the magnetic locking system as described herein also form preferred embodiments of the use of the magnetic locking system.

One aspect of the present invention relates to a use of the assembly described herein for a movable door or window system as a partition, wall, door, window or closure for closing a living space, such as a balcony, veranda or terrace. It is to be understood that preferred embodiments of the door or window supporting system as described herein also form preferred embodiments of the use of door or window supporting system.

One aspect of the present invention relates to a method for mounting a magnetic locking system in a movable object. It is to be understood that preferred embodiments of the magnetic locking system as described herein also form preferred embodiments of this method.

In one embodiment, the method comprises the following steps:

(a) providing a movable object that is configured to be mounted movably in the frame; wherein the movable object comprises a locking mechanism;
(b) mounting at least one stop element to a top and/or bottom of the frame;
(c) mounting a tensioning mechanism to a corresponding top and/or bottom of the movable object;
(d) mounting a tensioning cable in the locking mechanism;
(e) mounting a blocker to the corresponding top and/or bottom of the movable object and connecting the blocker to the tensioning cable;
(f) putting the tensioning cable under tension with the tensioning mechanism.

It is also clear that alternative embodiments of such a method are possible for assembling a magnetic locking system for releasably fixing a movable object to a frame, comprising the following steps:

(a) providing the movable object that is configured to be mounted movably in the frame; wherein the movable object comprises a locking mechanism;
(b) mounting at least one stop element to a top and/or bottom of the frame;
(c) mounting a movement mechanism 40 that is configured to bring about a movement of the movable object 10 relative to the frame 20, wherein the movement mechanism 40 comprises a holder 400, which has a passage 410 with a first opening for mounting the blocker 100 and a second opening for mounting a tensioning cable 310 connected to the blocker 100; and mounting the holder 400 between the movement mechanism 40 and the movable object 10;
(d) mounting a tensioning cable in the locking mechanism;
(e) mounting a blocker to the corresponding top and/or bottom of the movable object and connecting the blocker to the tensioning cable.

The invention claimed is:

1. A magnetic locking system for releasably fixing a movable object, including a movable door or window, to a frame, the locking system comprising:

at least one stop element, mounted to the frame;
at least one blocker, mounted to the movable object, that is configured to be moved between:
a retracted state configured to allow the blocker to move unhindered past the stop element; and,
an extended state configured to fix the blocker on the stop element when the blocker is moved till at the stop element;
a locking mechanism that is mounted to the movable object and is connected to the blocker, and is configured to selectively:

in a first state, disconnect the blocker to move it to the extended state;

in a second state, bring and/or hold the blocker in the retracted state; and wherein the blocker comprises a magnet and the stop element comprises a magnetically attractable material, and/or vice versa; configured so that in the extended state the blocker is fixed to the stop element by attraction of the magnet toward the magnetically attractable material, wherein the locking system further comprises a movement mechanism that moves within the frame and is configured to bring about a movement of the movable object relative to the frame; wherein the movement mechanism comprises a holder, which has a passage with a first opening for mounting the blocker and a second opening for mounting a tensioning cable connected to the blocker; and wherein the holder is mounted between the movement mechanism and the movable object.

2. The locking system as claimed in claim 1, wherein the locking mechanism further comprises:

the tensioning cable, with one end connected to the blocker; and a locking component that is configured to switch the locking mechanism selectively between the first state and the second state by acting upon the tensioning cable.

3. The locking system as claimed in claim 1, wherein the stop element comprises a recess, which is configured for inserting and mechanically fixing the blocker in the extended state.

4. The locking system as claimed in claim 1, comprising at least two stop elements, which are mounted at various positions along the length of the frame; so that the movable object is lockable at various positions along the length of the frame.

5. The locking system as claimed in claim 1, wherein the locking mechanism comprises:

the tensioning cable connected with one end to the blocker, which is configured to limit the movement of the blocker to the extended state;

a tensioning mechanism that is configured to put the tensioning cable under tension by clamping the blocker in the retracted state; and a locking component that is configured to switch the locking mechanism selectively between the first state and the second state by acting upon the tensioning cable.

6. The locking system as claimed in claim 5, wherein the locking component comprises a pivoting body that is provided with at least one opening through which the tensioning cable runs; configured so that a rotation of the pivoting body bends the tensioning cable at least partially.

7. The locking system as claimed in claim 6, wherein the locking mechanism comprises a supporting element, arranged between the blocker and the pivoting body, for supporting the tensioning cable.

8. The locking system as claimed in claim 6, wherein the locking mechanism comprises a handle that is linked to the pivoting body and is configured to rotate the pivoting body selectively.

9. The locking system as claimed in claim 5, wherein the tensioning cable is connected with one end to a first blocker and with another end to a second blocker.

10. The locking system as claimed in claim 5, further comprising the movement mechanism that is configured to bring about a movement of the movable object in the frame; wherein the movement mechanism comprises a holder, which has a passage with a first opening for mounting the blocker and a second opening for mounting the tensioning cable; and wherein the holder is mounted between the movement mechanism and the tensioning mechanism.

11. The locking system as claimed in claim 10, wherein the tensioning mechanism comprises a spring system, which is configured to clamp the holder against the movement mechanism.

12. The locking system as claimed in claim 11, wherein the tensioning mechanism comprises an insertion slot that opens out onto the spring system and/or a connecting piece, connected to the spring system; wherein the holder comprises a stop that is insertable in this insertion slot.

13. The locking system as claimed in claim 10, wherein the tensioning mechanism comprises an adjuster that is configured to adjust the distance between the tensioning mechanism and the movement mechanism by controlling the maximum tension range of the tensioning mechanism.

14. An assembly for a movable door or window system comprising:

a frame and a movable object, including a movable door or window, that is mounted movably in the frame; and, a magnetic locking system as claimed in claim 1 for releasably fixing the movable object to the frame.

15. A method for assembling a magnetic locking system as claimed in claim 1 for releasably fixing the movable object to the frame, comprising the following steps:

(a) providing the movable object that is configured to be mounted movably in the frame; wherein the movable object comprises the locking mechanism;

(b) mounting at least one stop element to a top and/or bottom of the frame;

(c) mounting the movement mechanism that is configured to bring about the movement of the movable object relative to the frame, wherein the movement mechanism comprises the holder, which has the passage with the first opening for mounting the blocker and the second opening for mounting the tensioning cable connected to the blocker; and mounting the holder between the movement mechanism and the movable object;

(d) mounting a tensioning cable in the locking mechanism;

(e) mounting the blocker to at least one of the corresponding top and bottom of the movable object and connecting the blocker to the tensioning cable.

16. A method of using the magnetic locking system as claimed in claim 1 further comprising releasably fixing the movable object to the frame, at two or more different positions of the movable object relative to the frame.

17. A method of using the assembly as claimed in claim 14 further comprising with at least one of the door, and window, closing at least one of a living space, a sliding door or sliding window.

18. The locking system as claimed in claim 7 in which the locking mechanism further comprises at least one of an opening or slot through which the tensioning cable runs.

19. The locking system as claim in claim 12 wherein the stop forms a flange.

20. The locking system as claimed in claim 13 wherein the adjuster comprises a rotatable element, comprising a bolt, which when turned, acts upon the spring system and/or the connecting piece.

* * * * *